Figure 1:
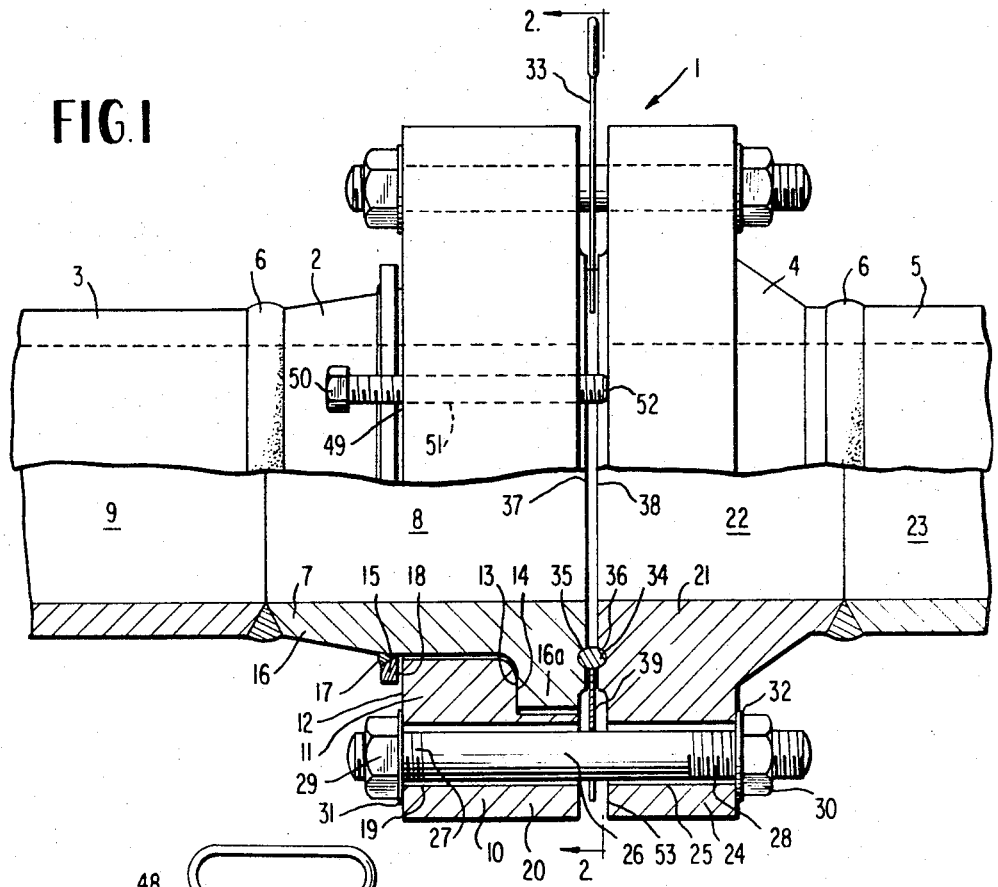

United States Patent [19]
Ward et al.

[11] 3,730,537
[45] May 1, 1973

[54] METHOD AND APPARATUS UTILIZING HANDLED SEAL FOR SUBMERGIBLE COUPLING

[75] Inventors: Delbert R. Ward; William R. Rochelle, both of Houston, Tex.

[73] Assignee: Brown & Root, Inc., Houston, Tex.

[22] Filed: July 20, 1971

[21] Appl. No.: 164,359

Related U.S. Application Data

[62] Division of Ser. No. 824,959, May 15, 1969, Pat. No. 3,620,554.

[52] U.S. Cl.............................................277/1, 277/10
[51] Int. Cl................................F16l 23/00, F16j 9/00
[58] Field of Search..........................277/10, 11, 166, 277/1; 285/18, 363

[56] References Cited

UNITED STATES PATENTS

| | | |
|---|---|---|
| 3,573,870 | 4/1971 | Gastineau..............................277/11 |
| 2,192,739 | 3/1940 | Goetze..................................277/166 |
| 1,942,704 | 1/1934 | Hubbard et al........................277/11 |
| 1,896,795 | 2/1933 | Kendall.................................277/10 |
| 3,480,301 | 11/1969 | Kroening...........................277/180 X |

Primary Examiner—Samuel B. Rothberg
Attorney—Burns, Doane, Benedict, Swecker & Mathis

[57] ABSTRACT

Seal method and apparatus for use in a submerged coupling and including a generally annular seal operable to be interposed between two conduit couplings. A bifurcated alignment web connected with the seal is operable to engage a stud bolt of the conduit couplings and to responsively position the seal in generally longitudinal alignment with, and interposed between, the conduit couplings. A handle connected with the seal projects generally outwardly of the conduit couplings when the alignment web is so engaged, and carries an alignment locking aperature engageable by another bolt to impede skewing or canting of the aligned seal.

10 Claims, 7 Drawing Figures

PATENTED MAY 1 1973 3,730,537

SHEET 1 OF 2

INVENTORS
DELBERT R. WARD
WILLIAM R. ROCHELLE

BY

PATENTED MAY 1 1973 3,730,537

SHEET 2 OF 2

INVENTORS
DELBERT R. WARD
WILLIAM R. ROCHELLE

METHOD AND APPARATUS UTILIZING HANDLED SEAL FOR SUBMERGIBLE COUPLING

RELATED APPLICATION

This application is a division of U.S. Pat. application Ser. No. 824,959, now U.S. Pat. No. 3,620,554, filed May 15, 1969 by Delbert R. Ward and William R. Rochelle for "Submergible Flange Coupling and Gasket".

GENERAL BACKGROUND, OBJECTS AND SUMMARY OF INVENTION

Offshore operations in the oil and gas industry are frequently conducted so as to require the coupling of conduit sections in a submerged location.

The interconnecting of large size, submerged conduit sections is at best a hazardous operation and often requires the assistance of divers.

Many underwater coupling connections are of the flange type, requiring that a seal or gasket be positioned between spaced coupling sections. Such a seal may be positioned by a diver, after which the coupling sections may be manipulated into sealing cooperation with the seal element.

The manipulation of the gasket and coupling sections can be extremely difficult and dangerous, particularly where the water in the underwater or submerged location is murky. Indeed, the degree of murkiness or turbidity may be such that the diver is required to manipulate a gasket and coupling sections, relying almost entirely upon his sense of touch.

This problem of poor visibility is often augmented by the bulky and heavy nature of coupling components associated with fairly large size, underwater conduits.

In recognition of operational problems of the type hereinbefore discussed, it is a principal object of the invention to provide a coupling apparatus which facilitates the manipulating of coupling members into appropriate but spaced alignment to facilitate the installation of a seal or gasket between the coupling members.

It is a further principal object of the invention to provide such an apparatus including securing and jack members which are generally circumferentially dispersed about the coupling members and are operable, at generally circumferentially displaced locations, to exert independent pushing and pulling forces on the coupling members, directed generally longitudinally of the conduit means associated with the coupling member.

A still further object of the invention is to mount the jack members on a coupling member so that they may be selectively positioned about the periphery of the coupling member and define a selectively positionable, pivot axis.

It is another object of the invention to provide an improved gasket structure which is conveniently removable from an underwater coupling or installable in an underwater and where the alignment of the gasket for installation purposes is virtually automatic and where a diver is able to manipulate the gasket without placing his hands or fingers in a position where they would be likely to be crushed or injured.

In accomplishing at least some of the foregoing objects, the present invention contemplates a coupling for interconnecting submerged conduit means. This includes first submergible conduit coupling means and second submergible conduit coupling means. Passage means extend generally longitudinally of the first and second submergible coupling means. A plurality of coupling connecting means is spaced circumferentially about the passage means. The coupling connecting means are operable to induce convergence of the first and second coupling means into fluid communicating and generally mutually sealed relationship. A plurality of jack means carried by the first conduit coupling means is spaced circumferentially about the passage means. The jack means are generally circumferentially displaced from the coupling connecting means. The jack means are operable independent of the coupling connecting means and are operable to induce relative movement between the first and second coupling means, with the coupling connecting means being substantially immobilized relative to the first coupling means.

In the context of this combination, a related aspect of the invention entails a gasket or seal assembly provided with a bifurcated aligning means operable to aligningly engage one of the coupling connecting means, i.e. fastener elements. This gasket or seal means is also provided with a manipulating handle which is positioned generally outwardly of the first and second coupling means during the gasket placing and securing operation, and also includes an alignment "locking" aperture.

Another independently significant facet of the invention resides in the mounting of jack members on a coupling member in such a manner as to define a selectively positionable pivot axis to facilitate the alignment of coupling members.

DRAWINGS

In describing the invention, reference will be made to preferred embodiments illustrated in the appended drawings.

Figure 2:
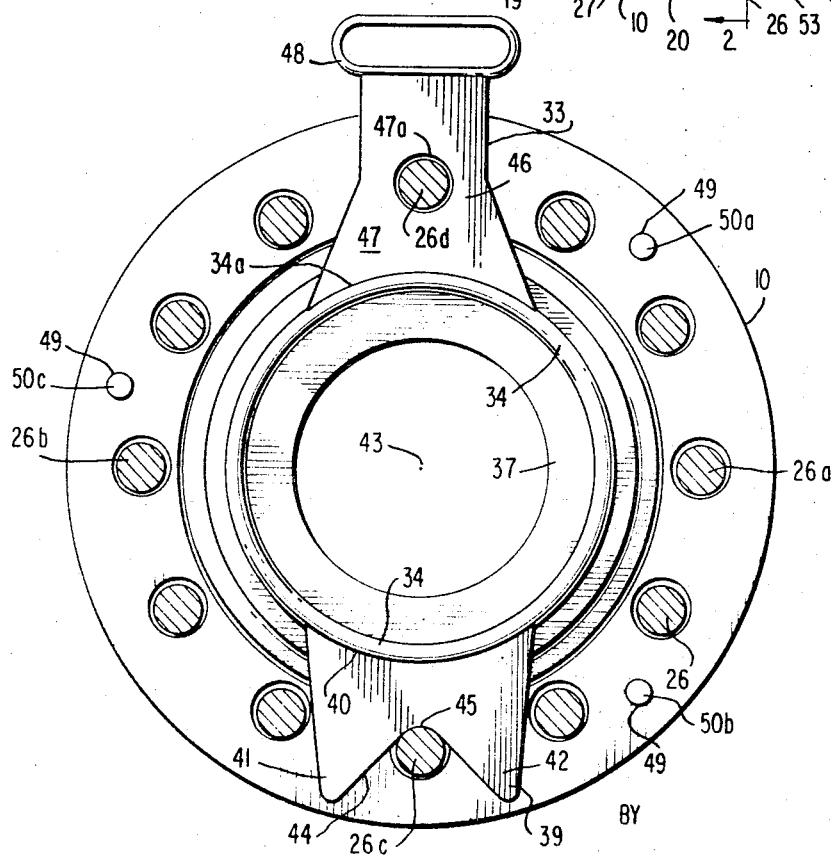
Figure 3:
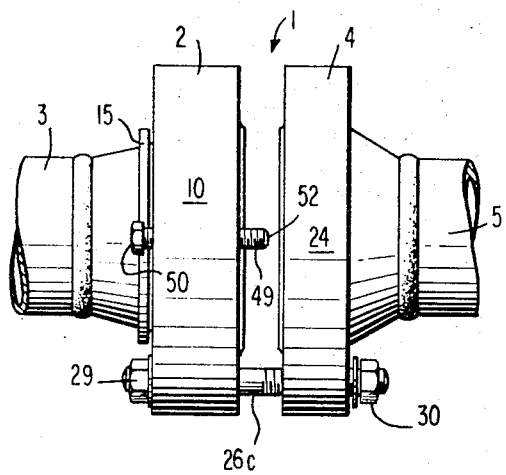
Figure 4:
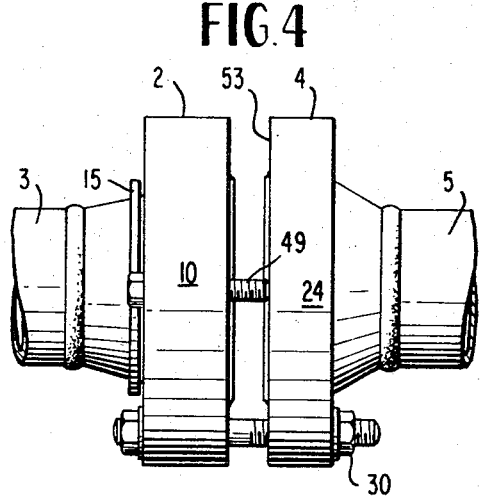
Figure 5:
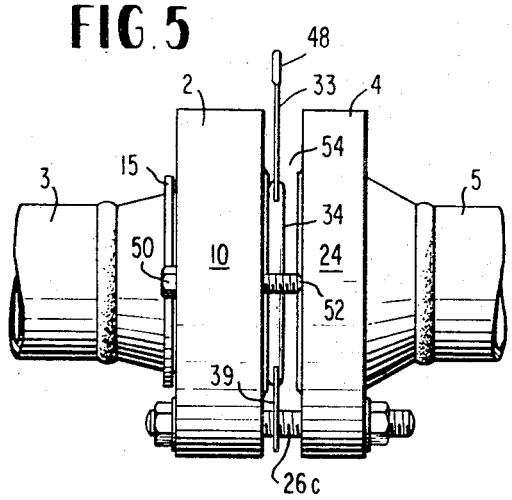
Figure 6:
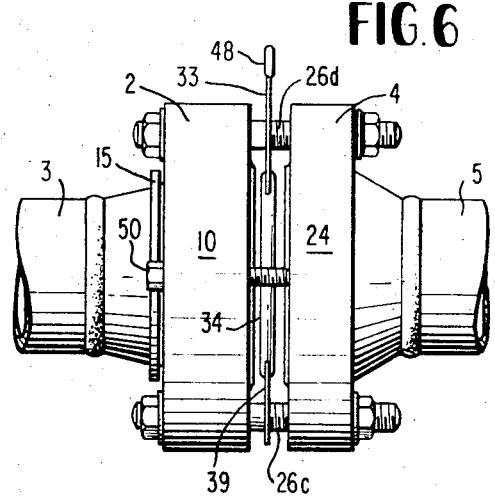
Figure 7:
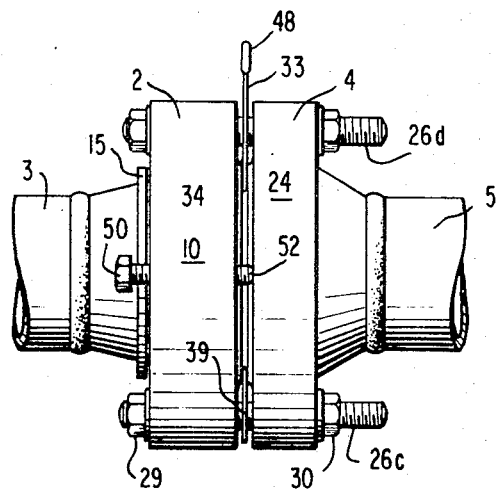

In the drawings:

FIG. 1 provides a partially sectioned, fragmentary, side elevational view of a flange-type coupling between submerged conduit portions, which coupling embodies the present invention;

FIG. 2 provides a transverse sectional view of the FIG. 1 coupling assembly as viewed along the section line 2—2 of FIG. 1;

FIGS. 3–7 provide a schematic representation of the sequence or mode of installation of the FIG. 1 coupling;

FIG. 3, in the schematic sequence, illustrates coupling components during the initiation of the coupling operation where the coupling elements are spaced and may be somewhat misaligned;

FIG. 4, in the coupling sequence, illustrates the manner in which coupling jack elements are operated independently of, but in cooperation with flange securing bolts to provide a rigidified assembly where the opposing faces of the coupling members are locked in spaced but generally parallel alignment;

FIG. 5, in the schematic sequence, illustrates the installation of a gasket or seal between the aligned and rigidified coupling members;

FIG. 6, in the schematic sequence, illustrates the manner in which the positioned gasket may be locked in aligned position with a connecting bolt; and FIG. 7, in the schematic sequence, illustrates the terminal coupling step wherein the fastening bolts and jack elements are independently manipulated in a properly coordinated manner to maintain the general stability of the assembly, while drawing the coupling members into sealing engagement with opposite sides of the gasket so as to cause the conduit means associated with the flange coupling elements to be brought into sealed and fluid communicating relationship.

STRUCTURAL DETAILS OF FLANGE-TYPE COUPLING EMBODIMENT

FIGS. 1 and 2 illustrate structural details of a preferred flange-type coupling assembly 1, constructed in accordance with the invention.

Coupling 1 comprises, as major components, first coupling means 2 connected with a first conduit or pipeline portion 3 and an axially opposed, second coupling means 4 connected to a second conduit or pipeline portion 5.

As shown in FIG. 1, coupling means 2 is connected in coaxial alignment with conduit section 3 as, for example, by the schematically shown welding zone 6. Similarly, coupling means 4 is connected in coaxial alignment with conduit means 5 by a welding zone 6. The conduit means 3, coupling means 2, coupling means 4, and conduit means 5 are all, when interconnected, disposed in substantially coaxial alignment.

Conduit means 3, coupling means 2, coupling means 4, and conduit means 5 may all be substantially cylindrical in cross-section, as shown in the illustrated embodiment. However, cross-sectional configurations, wall thickness, etc, may vary substantially in practicing the invention.

First coupling means 2 includes a generally cylindrical body portion 7 having a first passage 8 extending generally coaxially therethrough. Passage 8 defines a coaxial continuation of central passage 9 of conduit means 3.

A generally annular, first flange means 10 is mounted on body means 7 for rotation about the first passage 8. As shown in FIG. 1, flange 10 is generally L-shaped in cross-section.

A leg portion 11 of flange means 10, extending generally radially of the central axis of passage 8, provides axially spaced abutment walls 12 and 13. Wall 13 is abuttingly engageable with an abutment wall 14 defined and carried by body means 7. Wall 14 extends generally radially outwardly of body means 7, with respect to the central axis of passage 8. An annular securing ring 15 is fixedly mounted on the generally cylindrical portion 16 of body means 7. Ring 15 may be secured as, for example, by a welding zone 17, to body portion 16, and provides an abutment wall 18. Abutment wall 18 projects radially outwardly of the axis of passage 8 and is operable to abuttingly engage abutment wall 12 of flange means 10.

Abutment walls 14 and 18 are spaced longitudinally of the assembly 1 by a distance slightly exceeding the longitudinal distance between flange abutment walls 12 and 13. In this manner, the walls 18 and 14 function to prevent any significant axial movement of flange means 10 without impeding rotation of the flange means 10 about the body means 7.

A plurality of bolt holes or fastener receiving means 19 are spaced circumferentially about and carried by the flange means 10. As shown in FIG. 2, the various bolt receiving holes 19 are generally equally spaced about flange means 10, and extend generally longitudinally of the assembly 1, i.e. parallel to the central axis of passage 8. Thus, holes 19 are mutually parallel.

As shown in FIG. 1, the various bolt receiving holes 19 project longitudinally of the coupling means 2 through the generally axially extending, annular leg portion 20 of flange means 10. Leg portion 20 overlaps, but does not project, radially beyond a radially extending flange portion 16a of body means 7. Leg portion 20 is freely rotatable about flange portion 16a.

Second coupling means 4 is defined by a generally cylindrical second body means 21. Body means 21 is provided with a central passage 22 extending longitudinally therethrough. Second passage means 22 defines a coaxial extension of the central passage 23 of conduit means 5. As shown in FIG. 1, with the coupling 1 connected, the various passage means 9, 8, 22 and 23 are generally coaxially aligned and of substantially the same cross-sectional configuration. Generally, and as is shown in FIG. 1, the cross-section of these passage means would be circular in nature.

A generally radially extending flange portion 24 of second body means 21 is provided with a plurality of second bolt receiving or fastener receiving holes 25. Holes 25 are located on the flange portion 24 of body means 21 so as to define axial continuations of the bolt holes 19 of the flange means 10, when this flange means is rotated to align the bolt holes 19 with the bolt holes 25. Thus, the bolt holes 25 are of substantially the same size in cross-section as the bolt holes 19, are mutually parallel, and extend generally parallel to the central axis of passage means 22 and are generally circumferentially and equally spaced about flange 24.

Coupling 1 also includes a plurality of fastener elements or stud bolts 26.

As shown in FIG. 1, each bolt 26 may be circular in cross-section and slidably receivable within longitudinally aligned bolt holes 19 and 25. To facilitate the removal of each bolt 26 in either longitudinal direction of the coupling 1, each bolt 26 may be provided with threaded extremities 27 and 28. With each bolt 26 received by aligned bolt holes 19 and 25, a pair of internally threaded nuts 29 and 30, possibly in combination with washers 31 and 32, may be engaged with the threaded rod ends 27 and 28 and employed to draw the coupling means 2 and 4 into the converged or connected position shown in FIG. 1.

Thus, each bolt 26 serves to interconnect longitudinally aligned fastener receiving portions 19 and 25 of the first and second coupling means, respectively.

Each bolt 26 and its associated nuts 29 and 30 is operable to induce convergence of the first flange means 10 and second flange means 24 of the first and second coupling means, respectively, and thus also induce convergence of the body means 7 and 21 and the overall coupling means 2 and 4.

Assembly 1 also includes seal means 33, shown in side elevation and partial cross-section in FIG. 1 and shown in plan view in FIG. 2.

Seal means 33 includes an annular seal or gasket 34 which may be fabricated of conventional gasket material such as ductile metal, soft steel, plastic or other materials used for sealing or gasket purposes.

As shown in FIG. 1, seal 34 may be somewhat ovoid or elongate in the longitudinal direction of coupling means 1.

Seal or gasket 34 is intended to be sealingly received within mutually facing, and generally mirror image related, recesses 35 and 36 carried by the first coupling means 2 and second coupling means 4, respectively. Seal receiving groove 35 extends coaxially about the central axis of passage 8 and is formed on a generally radially extending, flange face 37 of first coupling means 2. Similarly, seal receiving groove 36 extends coaxially about the central axis of passage 22 and is formed on a generally radially extending flange face 38 of second coupling means 4.

As shown in FIGS. 1 and 2, seal means 33 is provided with a bifurcated alignment means or web 39. Web 39 may be generally sheet-like in nature, and generally oriented with a plane extending perpendicular to the central axis of passage means 8 and 22. Alignment web 39 is connected with an outer edge portion 40 of seal 34. In the arrangement shown in FIGS. 1 and 2, alignment web 39 projects downwardly from the underside 40 of seal 34 and is generally rigid.

Alignment web 39 is provided with a pair of outwardly diverging alignment fingers 41 and 42 which are located in a mirror image fashion and disposed generally symmetrically with respect to the common central axis 43 of seal 35 and passage means 8 and 22. Fingers 41 and 42 define a generally V-shaped, downwardly diverging camming edge 44. Camming edge 44 is designed to cooperate with a stud bolt, for example, lowermost bolt 26 of the FIG. 1 assembly, so as to substantially position the seal 34 in generally coaxial alignment with the seal receiving grooves 35 and 36.

In the arrangement shown in FIG. 2 where the root 45 of edge 44 conformingly engages the upper periphery of lower bolt 26, this alignment is facilitated by ensuring that the distance between the axis 43 of the seal 34 and the root 45 are substantially the same as the distance between the axis 43 of the passage means 8 and 22 and the upper periphery of the lower bolt 26. Obviously, however, different modes of abutting engagement between web 39 and a bolt 26 may be effected while maintaining the alignment function. It is merely necessary to ensure that edge 44 engages a bolt 26 to cause the central axis of seal 43 to be pivotal to a position of coincidence with the central axis of the aligned grooves 35 and 36.

With the alignment means 39 engaged with the lowermost bolt 26, minor lateral rocking of the seal 34 will serve to move the seal 34 into seatable engagement with the seal groove or seats 35 and 36.

The positioning of the seal 34 is facilitated by a handle means 46. Handle means 46 projects generally radially outwardly from the upper side of seal 34, i.e. generally diametrically opposite to the direction of projection of the alignment means 39.

In the FIG. 2 orientation, handle means 46 is defined by a web portion 47 connected with, and projecting radially upwardly from, an upper portion 34a of seal 34. An apertured grip 48 is mounted on web 47 so as to be located radially above the upper extremities of the flange portions 10 and 24 of the coupling means 2 and 4. Thus, a diver griping the centrally apertured grip 48 may lower the seal means 33 between the appropriately spaced, first and second coupling means 2 and 4 and position the web 39 in aligned cooperation with a previously inserted lower bolt 26. When the camming slot 44 is fully or centrally engaged with the upper periphery of the bolt 26, the diver can "lock" the aligned position of seal 34 by passing an upper stud bolt 26 through an aligning aperture 47a formed in web 47. Aperture 47a is sized to slidably receive a bolt 26 and then substantially prevent lateral movement of seal means 33 through engagement of the edge of the aperture 47a with the sides of the received bolt 26.

The final aligning of seal 34, prior to the insertion of the alignment locking bolt, may be effected by a diver gripping grip 48 and laterally "rocking" the gasket 34 about the pivot defined by the lower stud bolt 26 until the upper bolt 26 can pass through the aperture 47a. As will be appreciated, aperture 47a is positioned relative to edge 44 to ensure that the engagement of the upper and lower bolts with aperture 47a and edge 44 will coaxially align seal 34 with groove 35. Aperture 47a and edge 44 will tend to impede or prevent "skewing" or "canting" of seal 34 relative to groove 35 and thus tend to maintain parallelism between the elements.

Coupling 1 also includes a plurality of screw-type, flange jacking members 49.

As shown in FIGS. 1 and 2, each jacking element 49 comprises an externally threaded bolt 50 threadably mounted in an aperture 51 of leg 20 of flange means 10.

As shown in FIG. 2, three such jacking elements 49 are provided. These elements are displaced circumferentially about the flange means 10 and spaced generally circumferentially from, or generally interspersed with, the fastener receiving openings 19.

The bolts 50 and their associated mounting holes 51 extend parallel to the central axis 43 of the assembly.

Each jacking element 49 is provided with an abutment defining end 52. Each abutment defining end is operable to abuttingly engage a generally radially extending flange face 53 of the second flange means 24.

By screwing a bolt 50 in and out of its mounting hole 51, the longitudinal position of the abutment 52 may be appropriately adjusted between the first flange means 10 and the second flange means 24. As will be hereinafter described, the jacking elements 49 serve to facilitate the obtaining of the desired spaced and/or parallel alignment between the flange faces 37 and 38 of the coupling means 2 and 4.

Each bolt 50 is threaded so as to move away from the coupling means 4 as it withdraws its abutment 52 from the flange face 53 and is axially movable to permit complete convergence of the grooves 35 and 36 into sealing cooperation with opposite sides of the seal 34.

In other words, the bolts 50 may be manipulated or withdrawn from abutting engagement with the second coupling means 4 so as to permit the bolts 26 and their associated nuts to be manipulated and induce convergence of the flange means 10 and 24 and thus cause the grooves 35 and 36 to sealingly engage opposite, longitudinally facing sides of the seal means 34.

Mode of Operation of Flange Type Coupling

The manner in which the coupling 1 may be manipulated in a submerged or underwater environment to effect the joining of conduit or pipeline sections adjacent a submerged surface is shown schematically in FIGS. 3–7.

FIG. 3 illustrates the components of the coupling 1 where the coupling means 2 and 4 are somewhat separated.

As shown in FIG. 3, the conduit means 3 and 5 are disposed in generally longitudinal alignment. The positioning of the conduit means 3 and 5 in this general alignment may be implemented by a diver or by a diver assisted by other divers or hoisting lines extending upwardly to hoisting gear on floating vessel means.

With the conduit means 3 and 5 generally aligned, the rotatable first flange means 10 may be rotated on the body 7 of the coupling means 2 to generally longitudinally align the bolt receiving holes 19 with the bolt receiving holes 25 and position the jack means 49 to provide the desired jack action. With the bolt receiving holes 19 and 25 thus generally aligned, the diver or divers may loosely install two, side located, stud bolts 26 and a lowermost stud bolt 26. As shown in FIG. 2, the side bolts are generally designated 26a and 26b and the lowermost stud bolt is generally designated 26c.

FIG. 3 illustrates the "loose" installation of the representative lower stud bolt 26c, with the nuts 29 and 30 only partially secure.

As will be appreciated, the bolt receiving holes 19 and 25 will be somewhat "oversize", in diameter, with respect to the shanks of the stud bolts 26 so as to permit the initial positioning of the stud bolts in the generally aligned openings 19 and 25, even though there may be some degree of misalignment of the coupling means 2 and 4. In other words, the bolts may be inserted in holes 19 and 25 even when these holes are not absolutely coaxially aligned.

Either before or after the installation of the stud bolts 26a, 26b and 26c, the screw jack bolts 50 are advanced toward coupling means 4 in their threaded mounting holes 51 so as to position the abutment means 52 at a desired stop or alignment position intermediate the coupling means 2 and 4. This general positioning of the abutment means 52 is indicated in FIG. 3.

With the side and lower stud bolts installed, and with the abutments 52 appropriately positioned, the nuts 30 and/or 29 associated with the stud bolts 26a, 26b and 26c are tightened so as to induce convergence of the flange means 10 and 24. This convergence will cause the face 53 to abuttingly engage the similarly positioned abutment means 52 of the three jacking bolts 50. Abutting engagement between the face 53 and the abutment means 52, as a result of the tightening of the nuts associated with the stud bolts, will rigidify the assembly 1 with the seal receiving faces 37 and 38 disposed in generally parallel and coaxially aligned relation as shown in FIG. 4.

With the assembly 1 rigidified in appropriate alignment, i.e. with the faces 37 and 38 locked in parallel and coaxial relation but axially spaced from the FIG. 1 position, a diver or divers, by manipulating the grip 48, will lower the seal means 33 downwardly into the cavity 54 between the body means 7 and body means 21. As shown in FIG. 2, the jack elements 49 and the side stud bolts 26a and 26b are spaced so as to permit this manipulation of the seal means 33.

The diver lowers the seal means 33 until the guide or cam slot 44 is disposed in centered alignment with the lower stud bolt 26c as shown in FIG. 2. This completed installation is illustrated in side elevation in FIG. 5.

With the seal means thus generally aligned with the assembly 1, completed alignment may be obtained and "locked" by inserting a top stud bolt 26d. The top stud bolt 26d intersects the alignment aperture 47a formed in web means 47 of seal means 33. With the top stud bolt 26d intersecting the alignment aperture 47a, coaxial alignment of the seal 34 with the seal receiving grooves 25 and 36 is assured.

As will be appreciated, the passage of the stud bolt 26d through the alignment aperture 47a may be effected with the diver grasping the grip 48 and making appropriate lateral adjustments in the position of the gasket 34 by "rocking" the seal means 33 about the pivot defined by the lower stud bolt 26c.

The completed installation of the top stud bolt 26d is illustrated in FIG. 6.

With the gasket 34 secured in its aligned position, the diver or divers at the submerged site may install the remaining stud bolts 26 and unscrew or "back-off" the jacking bolts 50 so as to move the abutment means 52 away from the coupling means 4. With the abutment means 52 withdrawn from abutting engagement with the face 53, the nuts associated with the stud bolts 26 may be tightened so as to cause convergence of the seal receiving grooves 35 and 36 into sealing cooperation with opposite sides of the gasket or seal 34.

The withdrawing of the abutment means 52 and the tightening of the nuts associated with the stud bolts 26, while independently effected, is preferably accomplished in such a manner as to retain the general rigidity assembly and parallel alignment of the faces 37 and 38. This maintenance of rigidity and alignment may be effected by sequentially withdrawing the abutment means 52 to a slight extent and then tightening the nuts associated with the stud bolts to take up the "slack" occasioned by the withdrawing of the abutment means 52. This mode of manipulation may be repeated on a cyclic basis until the connecting of the coupling means 1 is completed as shown in FIGS. 1 and 7. Alternatively, divers, under some circumstances, may withdraw the bolts 52 while concurrently tightening the nuts associated with the stud bolts 25 so as to maintain generally constant rigidity in the assembly 1 during the seal engaging operation.

The convergence of the flanges 10 and 24 is fairly small in magnitude in comparison with the overall longitudinal dimension of the conduit portions 3 and 5. Existing "slack" in conduit portions 3 and 5, the existence of a telescoping joint in either of conduit portions 3 or 5, the generally movable nature of one of the conduit portions, or a variety of other conditions, will permit the convergence of the coupling members as described in the sequence shown in FIGS. 4–7.

As will be appreciated, the independently operable character of the jack means 49 and securing means 26 enables a diver or divers to maintain complete control at all times over the relative orientation between the coupling members 2 and 4. Any minor misalignment which may have existed at the start of the coupling operation can be corrected and the engendering of further error during the seal engaging operation avoided.

Further, the abutment means 52 provide pivot points engageable with the coupling means 4 so as to enable the circumferentially displaced stud bolts to induce relative pivotal movement of the coupling means 2 and 4 into an appropriate degree of alignment.

When it becomes appropriate to remove the seal means 33 for servicing or gasket replacing services, the sequence of FIGS. 4-7 may be repeated in reverse order to effect the removal of the seal means 33. The installation of the new seal means 33 or replacement unit may be effected by then reimplementing the steps illustrated in FIGS. 4-7.

When the jack bolts 50 are employed to induce separation of the coupling means 2 and 4, the securing ring 15 provides a reaction surface 18 to enable a pushing force to be transmitted between the coupling means 2 and 4.

Alignment Function of Jack Units

The selective axial adjustability of the abutment means 52, in combination with the mounting of the jack units 49 for selective rotation about the body means 7 affords a unique coupling alignment concept.

Returning again to FIG. 3, a diver or divers may be confronted with coupling means 2 and 4 disposed in a somewhat canted, "skewed", or otherwise nonaligned condition.

In order to restore the coupling means to a suitable degree of alignment, with the grooves 35 and 36 generally parallel to each other, it may be necessary to reorient coupling means 4 so as to cause the groove 36 to become parallel to the groove 35.

Either by a sense of feel, or possibly through visual observation, a diver or divers would be able to determine the nature of the misalignment between the coupling means 2 and 4. In many instances, such misalignment would result from the conduit means 3 and 5 lying on a submerged surface with their axes mutually inclined such that the planes of the groove bearing faces 37 and 38 were generally converging in one direction laterally of the conduit means 3 and 5.

Once such a misalignment condition was detected, the diver or divers could orient flange 20 so as to position two jack means in generally superposed alignment on the side of the coupling assembly in the direction of convergence of the faces 37 and 38. By then advancing the two screw jacks 50a and 50b as shown in FIG. 2, to position the abutments faces 52 at the same longitudinal distance from the flange 20, the abutment means 52 of the screw jacks 50a and 50b, when engaged with the face 53, would define a generally vertical pivot axis between the coupling means 2 and 4.

With the pivot axis thus defined, and extending generally parallel to an intersection defined by planar extensions of the faces 37 and 38, the bolts 26 and their associated nuts may be manipulated so as to pivot one or the other or possibly both of the coupling means about the pivot axis and restore the coupling means to parallel alignment.

This mode of realignment is thus effected with optimum efficiency, and involves a manipulation of coupling members directly related to the nature of the misalignment.

The abutment 52 carried by the third jack screw 50c shown in FIG. 2 would be positioned at the same axial distance from the flange 20 as the axial spacing of the abutment means 52 of the jack screws 50a and 50b from flange 20 so as to automatically interrupt the relative pivotal movement between the coupling means 2 and 4 when the parallel relationship between grooves 35 and 36 has been attained.

As will be appreciated, the mounting of the jack units 49 on the rotatable flange means 20 enables the realignment pivot axis between the coupling means 2 and 4 to be selectively positioned by a diver or divers in accordance with the precise nature of the misalignment condition.

PRINCIPAL ADVANTAGES AND SCOPE OF INVENTION

The flange assembly 1 is particularly advantageous in that it permits a diver to align coupling members and install a flange in this aligned condition where virtually no visibility exists, with the chances of diver injury being minimized.

The independently operable nature of the jack members and coupling securing members facilitates the adjusting of relative positions between coupling members, while maintaining absolute control over coupling component movement and, if desired, while maintaining substantial rigidity of the coupling assembly. This constitutes a substantial advance over concepts discussed, for example, in the Meyer et al. U.S. Pat. No. 2,833,566 where operationally interrelated jack and securing members, of necessity, are mutually interfering. In addition, the coaxial orientation of jack and securing members in the Meyer et al concept lacks the desirable feature of the present arrangement where the jacks provide pivot abutments displaced from the direction of applied force of the coupling members.

The mounting of the mutually independent jacking screws and securing stud bolts on the rotatable flange of the present invention is especially significant from the standpoint of enabling the jacking screws to be located at a desired position of circumferential location, depending upon the degree of flange misalignment which is sought to be corrected. Such desired and selective circumferential positioning of the jacking screws is not possible, for example, with arrangements such as those featured in Weymouth U.S. Pat. No. 1,206,185 nor with respect to the arrangement featured in the Meyer et al. U.S. Pat. No. 2,833,566.

The seal or gasket arrangement is also advantageous in that the apertured handle and bifurcated alignment web provide a virtually foolproof arrangement to facilitate the installation of the gasket or seal assembly.

It is believed that the bifurcated alignment web is substantially more positive and reliable an operation than the concept disclosed in the Kendall U.S. Pat. No. 1,896,795 where alignment is sought to be achieved by peripheral engagement between a seal and previously installed stud bolts. Further, the alignment web and "locking" aperture of the gasket of the present invention impede canting of the gasket, which canting is quite possible in the Kendall proposal.

Those skilled with the submerged coupling art and familiar with the disclosure of this invention may well recognize additions, deletions, substitutions, and other modifications which would fall within the purview of this invention.

For example, in the FIG. 1 flange assembly, the jacking screws may be mounted upon lugs projecting radially outwardly from the flange leg 20. Appropriate stop lugs may project radially outwardly from the flange 24 so as to provide alignment surfaces engageable with the jack screws.

Jack manipulating arrangements other than screw jacks may be employed and coupling arrangements other than stud bolts may be utilized.

It is also apparent that the configuration of the seal and the seal receiving portions of the coupling components may be substantially altered within the purview of the invention. Substantial variations with respect to the disclosed shape, cross-sectional configuration, wall thicknesses, etc., with respect to the FIG. 1 assembly fall within the purview of the invention.

As will also be recognized, the gasket means 13 may be inserted between the coupling means 2 and 4 laterally or in an inclined fashion as well as being inserted in a generally vertical manner. Further, depending upon conditions encountered by the diver, the sequence, jack, and stud bolt operations illustrated in FIGS. 3–7 may be substantially altered and modified. The numbers, shapes, structural character, locations and mode of operation of the jacks and fastener means may vary substantially.

Having described the invention with respect to a preferred embodiment, it will be recognized that this embodiment as well as variations of the nature described above fall within the purview of the invention as set forth in the appended claims.

We claim:

1. A seal apparatus for use in a submerged coupling, said apparatus comprising:
   a generally annular seal means operable to be interposed between first and second coupling means;
   bifurcated alignment means connected with said seal means and operable to engage aligning means carried by at least one of said coupling means and, in response to engagement with said aligning means, position said seal in generally longitudinal alignment with, and interposed between, said first and second coupling means; and
   handle means connected with said seal means, said handle means projecting generally outwardly from said seal means;
   said handle means, with said bifurcated alignment means engaged with said aligning means, being located generally outwardly of said first and second coupling means; and
   alignment locking means carried by said handle means and operable to lock said seal means in alignment with at least one of said coupling means.

2. Apparatus according to claim 1 wherein said alignment means comprises an alignment web connected with said seal means and provided with a pair of outwardly projecting and diverging alignment fingers engageable with said aligning means carried by said at least one of coupling means.

3. Apparatus according to claim 2 wherein said alignment fingers are located in a generally mirror image fashion and disposed generally symmetrically with respect to a common central axis of said seal and said at least one of said coupling means.

4. Apparatus according to claim 3 wherein said alignment fingers define a camming edge cooperable with said aligning means to substantially position said seal in generally co-axial alignment with a seal receiving groove of said at least one of said coupling means.

5. Apparatus according to claim 4 wherein said handle means projects radially outwardly from said seal in generally diametrically opposed relationship to the direction of projection of said alignment fingers.

6. Apparatus according to claim 1 wherein said handle means comprises an aperatured grip.

7. Apparatus according to claim 2 wherein aid alignment locking means comprises an aligning aperture formed in a web portion of said handle means, which aligning aperture is operable to slidably receive a locking member of at least one of said coupling means with said seal means in said position in generally longitudinal alignment with, and interposed between said first and second coupling means.

8. A seal apparatus for use in a submerged coupling, said apparatus comprising:
   a generally annular seal means operable to be interposed between first and second coupling means;
   bifurcated alignment means connected with said seal means and including an alignment web provided with a pair of outwardly projecting and diverging alignment fingers, said alignment fingers being operable to engage aligning means carried by at least one of said coupling means and, in response to engagement with said aligning means, position said seal means in generally longitudinal alignment with, and interposed between, said first and second coupling means; and
   alignment locking means comprising an aligning aperture in a web portion of said handle means and operable to lock said seal means in alignment with at least one of said coupling means.

9. A method of sealing a submerged coupling, the method utilizing a generally annular seal means operable to be interposed between first and second coupling means; bifurcated alignment mans connected with said seal means and operable to engage aligning means carried by at least one of said coupling means; handle means connected with said seal means, said handle means projecting generally outwardly from said seal means; said handle means, with said bifurcated alignment means engaged with said aligning means, being located generally outwardly of said first and second coupling means; and alignment locking means carried with said handle means, and operable to lock said seal means in alignment with at least one of said coupling means; the method comprising:
   manipulating the handle means to position the bifurcated alignment means in engagement with the aligning means and interposed between the first and second coupling means;
   with the bifurcated alignment means in engagement with the aligning means, manipulating the handle means to position the seal means in generally longitudinal alignment with the first and second coupling means; and impeding canting of the seal means relative to the first and second coupling means by locking the locking means carried with the handle means with the seal means in aligned position.

10. A method according to claim 9 wherein the second step of manipulating the handle means comprises manipulating the handle to rock the seal means laterally into seatable engagement with a seal groove of at least one of said coupling means.

* * * * *